United States Patent [19]
Shibata et al.

[11] Patent Number: 6,059,899
[45] Date of Patent: May 9, 2000

[54] PRESS-FORMED ARTICLE AND METHOD FOR STRENGTHENING THE SAME

[75] Inventors: Masashi Shibata; Masazumi Onishi, both of Toyota; Shinji Kurachi, Kounan; Kouji Makino, Susono, all of Japan

[73] Assignee: Toyota Jidosha Kabushiki Kaisha, Toyota, Japan

[21] Appl. No.: 08/878,627

[22] Filed: Jun. 19, 1997

[30] Foreign Application Priority Data

Jun. 28, 1996 [JP] Japan ................................ 8-170210

[51] Int. Cl.[7] .............................................. C21D 9/00
[52] U.S. Cl. ........................ 148/320; 148/639; 148/644
[58] Field of Search .................................. 148/643, 644, 148/639, 654, 661, 320

[56] References Cited

U.S. PATENT DOCUMENTS

| | | | |
|---|---|---|---|
| 3,703,093 | 11/1972 | Komatsu et al. | 148/647 |
| 4,010,969 | 3/1977 | Cantrell et al. | 148/643 |
| 5,238,510 | 8/1993 | Dutton et al. | 148/639 |

FOREIGN PATENT DOCUMENTS

| | | |
|---|---|---|
| 54-78311 | 6/1979 | Japan . |
| 4-72010 | 3/1992 | Japan . |
| 6-12137 | 2/1994 | Japan . |
| 6-116630 | 4/1994 | Japan . |

OTHER PUBLICATIONS

Patent Abstracts of Japan, vol. 095, No. 002, Mar. 31, 1995, JP 06-330165, Nov. 29, 1994.
Patent Abstracts of Japan, vol. 018, No. 186 (M-1585), Mar. 30, 1994, JP 05-345519, Dec. 27, 1993.
Patent Abstracts of Japan, vol. 016, No. 277 (C-0954), Jun. 22, 1992, JP 04-072010, Mar. 6, 1992.

*Primary Examiner*—Deborah Yee
*Attorney, Agent, or Firm*—Oblon, Spivak, McClelland, Maier & Neustadt, P.C.

[57] ABSTRACT

A press-formed article has a quenched area and a required strength distribution. The quenched area has a hardness distribution exhibiting a hardness transition which corresponds to the required strength distribution. The press-formed article may include one end portion, the other end portion, and a central area disposed between the one end portion and the other end portion. The quenched area is extended from the one end portion and to the other end portion. The hardness distribution of the quenched area exhibits a condition that hardness is the highest in the central area in such a manner that hardness is gradually decreased from the central area to the one end portion and to the other end portion.

31 Claims, 8 Drawing Sheets

PRIOR ART

PRESS-FORMED ARTICLE AND METHOD FOR STRENGTHENING THE SAME

BACKGROUND OF THE INVENTION

Field of the Invention

This invention relates to a press-formed article and a method for strengthening the same.

DESCRIPTION OF THE RELATED ART

Japanese Unexamined Patent Publication (KOKAI) No. 6-116,630 (1994) discloses a technique that portions required for strength are quenched by use of an induction hardening to strengthen vehicle-bodies.

Also, Japanese Unexamined Patent Publication (KOKAI) No. 4-72,010 (1992) discloses a technique that portions required for strength are irradiated by high-density energy such as laser beams to be transformed to a plurality of bead-shaped quenched portions in press-formed articles such as parts of vehicle-bodies.

Moreover, in a field of vehicles, techniques for strengthening the press-formed article have been known—a technique that some portions of steel sheets are partially thickened according to the required level of strength, and another technique that reinforce members are connected partially in the form of being piled onto the vehicle-bodies by spot-welding.

Japanese Unexamined Utility Model Patent Publication (KOKAI) No. 6-12,137 (1994) discloses a technique that the middle portion of a pipe-shaped door impact beam, for being disposed in the inside of door so as to reinforce a vehicle-door, is quenched to strengthen itself by induction hardening with the both ends of the door impact beam unquenched.

Figure 11:
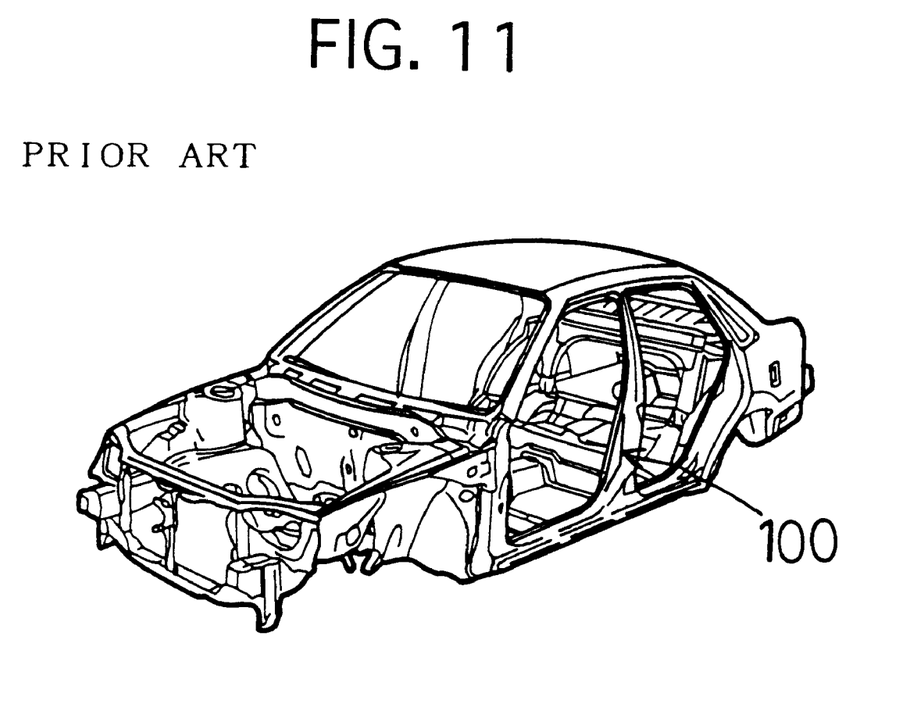
FIG. 11 is a perspective view showing a conventional vehicle-body having a center pillar.

Recently, occupant protection in collision has been required more and more with respect to a side impact of vehicle which means damage in a vehicle-side. Therefore, the neighborhood of a center-pillar has been strengthened. The center pillar is also called "B pillar", which is located between a front door and a rear door in a vehicle-side. FIG. 11 shows the center-pillar 100, which works as a support disposed between the front door and the rear door in the vehicle-side. For occupant protection in the side impact of vehicle, it is efficient that the neighborhood of the center-pillar is strengthened. Therefore, conventionally, a multi-layered construction have been used—a construction that a first reinforce member is piled onto the center pillar 100, and another construction that a first reinforce member and a second reinforce member are piled onto the center pillar 100.

The above-mentioned Japanese Unexamined Patent Publication (KOKAI) No. 6-116,630 (1994) and Japanese Unexamined Patent Publication (KOKAI) No. 4-72,010 (1992) acquire reinforcement resulting from quenching; however, their publications merely show the technique that quenching is carried out uniformly in articles. Also, Japanese Unexamined Utility Model Patent Publication (KOKAI) No. 6-12,137 (1994) shows that the quenched portion is uniform. Thus, hardness distribution thereof is basically uniform in the quenched area; so, strengthening is not always sufficient.

Further, the above-mentioned conventional technique which thickens the portion required for strength is disadvantageous in reducing weight thereof. Moreover, the above-mentioned conventional technique, which piles the additional reinforce member, changes the strength suddenly to constitute a hardness distribution having discontinuity. Accordingly, only adding the reinforce members is not always sufficient in strengthening the article.

SUMMARY OF THE INVENTION

The present invention has been conceived under the aforementioned circumstances. It is a general object of the present invention to provide a press-formed article and a method for strengthening a press-formed article which contributes to strengthening a vehicle body furthermore.

In a first aspect of the present invention, a press-formed article has a quenched area and a required strength distribution, and the press-formed article comprises:

the quenched area having a strength distribution exhibiting a hardness distribution which corresponds to the required strength distribution.

In a second aspect of the present invention, the press-formed article has one end portion and the other end portion, the hardness distribution of the quenched area exhibits a condition that hardness is high in the central area between the one end portion and the other end portion in such a manner that hardness is gradually decreased from the central area to the one end portion and to the other end portion.

In a third aspect of the present invention, a method for strengthening a press-formed article uses a press-formed article requiring a designated strength distribution. The method comprises the step of: quenching the press-formed article to constitute a quenched area having a hardness distribution exhibiting hardness transition which corresponds to the designated strength distribution.

In a fourth aspect of the present invention, quenching is carried out by use of an induction hardening apparatus having an induction-coil for heating the press-formed article and a cooling means for spouting coolant, and the hardness distribution is obtained by controlling heating conditions and cooling conditions in the induction hardening apparatus.

The press-formed article implies a member pressed before quenching. The press-formed article may be in a thin sheet shape, in a thick sheet shape, in a board shape, in a channel shape, or in an angle shape. In vehicles, the press-formed article may be a reinforce member for strengthening a vehicle-body. Also, the press-formed article may be a vehicle-body itself.

As for the press-formed article in vehicles, a center pillar reinforce member may be used. The center pillar reinforce member is a member for strengthening a center pillar which works as a support disposed between a front door and a rear door in a vehicle and which is sometimes called "B pillar".

Further, in vehicles, as for the press-formed article, the following can be used:—a roof side rail reinforce member to be disposed in the neighborhood of the center pillar reinforce member, or a rocker panel to support a lower portion of the center pillar reinforce member. Moreover, the press-formed article can be not only the aforementioned member but also other members to be used in another applications in addition to vehicles.

The press-formed article is made of a material capable of being quenched; so, the press-formed article may be a steel-family including carbon. The carbon content can be set, for example, in the range of from 0.07 to 0.2%. Unless a notice is described, "%" exhibits weight % hereinafter in this specification and attached drawings.

Generally, the quenched area can be constituted from its surface to its back surface in its depth direction. In the case where the press-formed article is thick, the quenched area can sometimes be constituted only in the neighborhood of the surface of the press-formed article. The quenched area implies the portion in which quenching was carried out.

The metallic structure of the quenched area is different in response to carbon content therein, heated temperature therein, and so on. Generally, the quenched area to require high hardness may has a metallic structure that at least one of bainite and martensite is increased: the quenched area not to require high hardness may has a metallic structure that pearlite or ferrite is mixed with at least one of bainite and martensite.

In a second aspect of the present invention, the press-formed article has one end portion and the other end portion; so, the press-formed article may be in relatively long size. In such a case, the quenched area may be continuously extended from the one end portion to the other end portion. Thus, the continuously extended quenched area has a hardness distribution exhibiting a condition that hardness is the highest in the central area between the one end portion and the other end portion, in such a manner that hardness is gradually decreased from the central area to the one end portion and to the other end portion.

This causes the following effect in the case where impact load is applied on the press-formed article. In a highly hardened area of the quenched area, resistance to deformation is ensured by its improved strength: in a area which isn't highly hardened, impact absorption is ensured. Namely, the second aspect of the present invention can advantageously be ensured in both performances of impact absorption and resistance to deformation.

Hardness varies in response to kinds of the press-formed article; in the highly hardened area in the quenched area, hardness can be set, for example, in the range of from Hv 300 to 500, especially in the range of from Hv 350 to 450. Also, in a area which isn't highly hardened, hardness can be set, for example, in the range of from Hv 150 to 350, especially in the range of from Hv 200 to 350.

In a third aspect of the present invention, the strengthening method uses a press-formed article requiring a designated strength distribution. The method is characterized in constituting a quenched area having a hardness distribution exhibiting hardness transition which corresponds to the designated strength distribution.

Quenching is generally carried out after press forming. A quenching means can include a heating means of supplying high-frequency current to an induction coil, and a cooling means of contacting coolant with the press-formed article. Frequency of the high-frequency current may be changed depending on the kind of the press-formed article. Frequency can be set in the range of from 10 to 450 kHz. The coolant can generally be water, it sometimes can be oil or the like depending to the kind of press-formed article.

Control of quenching temperature can constitute a hardness distribution in the quenched area of the press-formed article. In the area requiring high hardness out of the press-formed article, quenching temperature can be set in the vicinity from 950 to 1200° C. Also, in an area which doesn't require high hardness, quenching temperature can be set in the vicinity of 800 to 950° C.

In order to control the quenching temperature of press-formed article, the relative moving speed of an induction coil can be controlled with respect to the press-formed article. Concretely, in the area requiring high hardness, the relative moving speed of the induction coil can be set at a lower speed to increase the quenching temperature of the press-formed article. Also, in a area which doesn't require high hardness, the relative moving speed of the induction coil can be set at a higher speed to decrease the quenching temperature of the press-formed article. This realizes the aforementioned hardness distribution.

As to an incline rate in the hardness distribution, that is, as to an incline rate in the strength distribution, it is generally desirable that hardness is not suddenly changed but is gently increased and decreased as much as possible.

In order to constitute the aforementioned hardness distribution, the following factors can be used besides the relative moving speed of the quenching means: a frequency value and a current value of high-frequency current for supplying to an induction coil, further, an induced current running in heated portions of the press-formed article. That is to say, an increase of induced current enlarges Joule-Heat to raise the degree of induction-heat and to increase quenching temperature, thereby ensuring the quenching effect and thereby increasing the quenched hardness. On the other hand, a decrease of induced current in the heated portions of the press-formed article reduces Joule-Heat to demote the degree of induction heat and to decrease quenching temperature, thereby degrading the quenching effect and thereby decreasing the quenched hardness.

Advantages of the present invention will be described hereinafter. In the first aspect of the present invention, the quenched area arranged in the press-formed article has the hardness distribution possessing the hardness transition which corresponds to the required strength distribution with respect to the press-formed article. Thus, the press-formed article in the first aspect of the present invention advantageously has strength being required for itself.

Further, when other objects collide against the press-formed article, as for the hardened area of the press-formed article, resistance to deformation is ensured in the press-formed article. Also, as for the area which isn't highly hardened, impact absorption can be ensured. Therefore, the press-formed article has performances of both impact absorption and resistance to deformation in comparison with the conventional press-formed article whose hardness is uniform.

In the second aspect of the present invention, the press-formed article has a hardness distribution profiling a mountain configuration whose hardness is the highest in the central area disposed between one end portion and the other end portion and whose hardness is gradually decreased as it approaches one end portion and the other end portion.

Thus, when impact load is applied to the press-formed article, in the hardened area, resistance to deformation is ensured because of improved strength thereof. Also, in the area which isn't highly hardened, impact absorption can be ensured. Namely, the press-formed article has both performances of impact absorption and resistance to deformation. Therefore, strengthening is advantageously achieved in the side construction of vehicles such as the center pillar of vehicles.

In the third aspect and fourth aspect of the present invention, the press-formed article exhibiting the aforementioned advantages can be obtained

BRIEF DESCRIPTION OF THE DRAWINGS

A more complete appreciation of the present invention and many of its advantages will be readily obtained by reference to the following detailed description when considered in connection with the accompanying drawings and detailed specification, all of which forms a part of the disclosure.

PREFERRED EMBODIMENT OF THE PRESENT INVENTION

Preferred embodiment according to the present invention will be hereinafter described with reference to the drawings.

The present embodiment is an example for strengthening a center pillar reinforce member 1 to work as a press-formed article in a vehicle-body.

Figure 1:
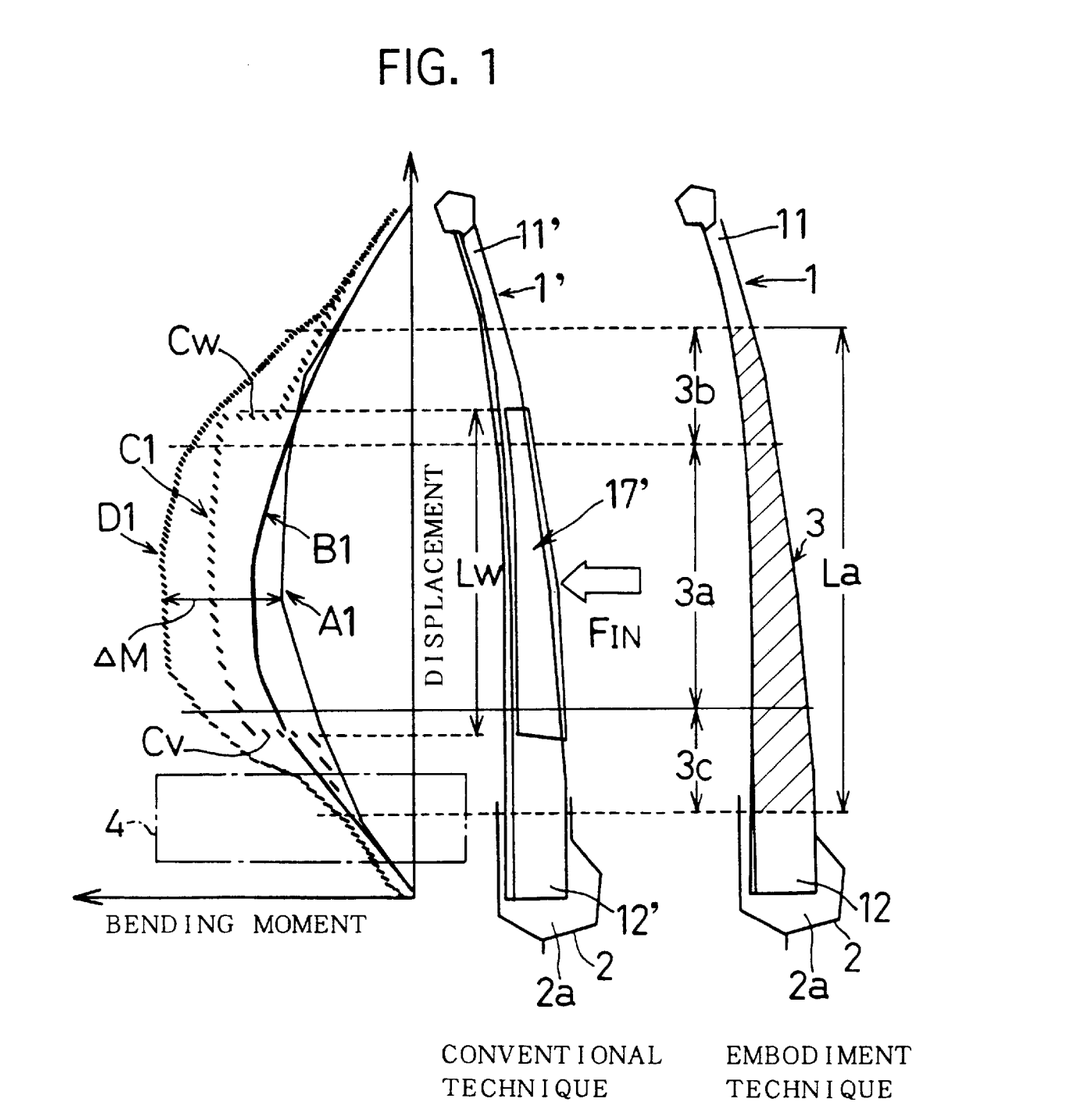
FIG. 1 is a constitututional diagram for showing a center pillar reinforce member and a graph for showing a bending moment loaded to this center pillar reinforce member.

The right side drawing of FIG. 1 shows a front view of the center pillar reinforce member 1 concerning the present embodiment. The center pillar reinforce member 1 has an approximately channel-shape in a cross section thereof. That is, It is press formed in a direction transverse to its length; the vertical direction in FIG. 4.

As above-mentioned, the center pillar reinforce member 1 is to be piled onto a center pillar 100 in FIG. 11 to strengthen the center pillar 100, which is called "B pillar" working as a support connecting a floor and a roof and located between a front door and a rear door in a vehicle-side. Therefore, the present embodiment is available in a deformation-resisting construction with respect to the side impact of vehicle, for example, with respect to the case where other vehicles and walls collide against a side of vehicle.

The left side of drawing of FIG. 1 shows that the center pillar reinforce member 1 has one end portion 11 disposed at the upper-side, and the other end portion 12 disposed at the lower-side. The center pillar reinforce member 1 is relatively long in the height direction of the vehicle. The center pillar reinforce member 1 is to be supported in the vehicle by use of a rocker panel 2 having a room 2a.

In a general side impact of vehicle, as shown the middle drawing of FIG. 1, the concentrated input load $F_{IN}$ is generally applied to the central area of the center pillar reinforce member 1'. Here, such input load decreases more and more as it goes to the one end portion 11' and to the other end portion 12' of the center pillar reinforce member 1'.

That is to say, as illustrated at "A1" in FIG. 1, an impact load distribution basically shows a profile of mountain configuration whose input load is high in the central area of the center pillar reinforce member 1' and whose input load decreases more and more it goes to the upper portion and to the lower portion of the center pillar reinforce member 1'.

Accordingly, in the present embodiment, the center pillar reinforce member 1 requires a sectioned construction and a material-thickness in such a manner that the center pillar reinforce member 1 has the strength moment distribution "B1" having strength exceeding the aforementioned impact load distribution "A1".

In vehicles, however, the center pillar reinforce member 1 is restricted in choice about a sectioned construction thereof, and is also restricted in an increase of thickness thereof because of weight reduction.

Accordingly, the conventional technique has practically been used in such a manner that another second reinforce member 17' (length: Lw) is piled and connected onto the central area of the center pillar reinforce member 1' by use of spot-welding. So, in the conventional technique, the center pillar reinforce member 1' is strengthened by the second reinforce member 17'. In the conventional technique, sine the second reinforce member 17' is piled onto the center pillar reinforce member 1', as shown at the strength distribution "C1" of FIG. 1, rising portions "Cw" and "Cv" rise suddenly with discontinuity in strength. In this conventional technique, since the strength distribution indicates discontinuity, the strengthening of center pillar reinforce member 1' isn't always sufficiently. Namely, only that strength exceeds the impact load isn't sufficient: in the case where strength only exceeds the impact load, stresses are unequally applied to discontinuous portions to occur ununiformity-deformations; so, expectable strength isn't obtained.

In order to obtain the distribution for strength to change continuously, it is required that some reinforce members are fully piled in such a manner that the third reinforce member is attached at the upper-side of the second reinforce member 17' and in such a manner that the fourth reinforce member is further attached at the lower-side of the second reinforce member 17'. This causes an increase in weight.

Meanwhile, according to the center pillar reinforce member 1 concerning the present embodiment, as apprehended from the right side drawing of FIG. 1, the second reinforce member 17' is abolished. That is to say, in the present embodiment, after the center pillar reinforce member 1 (thickness: for example 1.4 mm) is formed to become a desired construction by press forming, a quenched area 3 is continuously arranged between the one end portion 11 and the other end portion 12 of the center pillar reinforce member 1 along a length-direction thereof. This quenched area 3 possesses the strength distribution "D1", shown in FIG. 1, having a profile exhibiting a mountain-configuration.

As understood from FIG. 1, the strength distribution "D1" obtained by the quenched area 3 is approximately analogous to the impact load distribution "A1" in the side impact of vehicle, and the strength distribution "D1" has a distribution exceeding the impact load distribution "A1". Namely, the center pillar reinforce member 1 of the present embodiment exhibits that the strength distribution "D1" obtained by the quenched area 3 exceeds the impact load distribution "A1" with a safety-factor, as distinct from the conventional technique that rising portions "Cw" and "Cv" are suddenly raised because of the second reinforce member 17' attached to the center pillar reinforce member 1'.

The right side drawing of FIG. 1 shows that the quenched area 3 is indicated at "La" in the center pillar reinforce member 1. This quenched area 3 is approximately divided into the central area 3a for requiring the most strengthening with respect to the side impact of vehicle, one area 3b disposed at the upper-portion of the central area 3a, and the other area 3c disposed at the lower-portion of the central area 3a. The strength in the central area 3a affords to have the surplus strength by ΔM (shown in FIG. 1) as compared with the impact load distribution "A1". Thus, the central area 3a of the center pillar reinforce member 1 has resistance to deformation in the side impact of vehicle.

In other words, in the present embodiment, the most strengthened portion in the quenched area 3 is the central area 3a disposed approximately at the middle of the center pillar reinforce member 1 in the length-direction thereof. A height position of the central area 3a corresponds to the height position of the concentrated input load $F_{IN}$; so, the improved effect is further generated in occupant protection. The height position of the seat 4 for an occupant to sit down corresponds to the neighborhood of the other area 3c of the center pillar reinforce member 1.

The strength distribution "D1" in FIG. 1 shows that the strength level of the other area 3c is more decreased than the strength level of the central area 3a. Namely, the strength distribution "D1" shows that the safety-factor is large in the strength level of the central area 3a, and that the safety-factor is adequate in the strength level of the other area 3c.

Namely, the strength in the central area 3a considerably exceeds the impact load distribution "A1", and the strength in the other area 3c is approximately equal to the impact load distribution "A1". As a result, in the side impact of vehicle, the other area 3c of the center pillar reinforce member 1 can deform itself prior to deformation of the central area 3a; therefore, the other area 3c can absorb the impact energy in the side impact of vehicle owing to the deformation of the other area 3c.

Also, the one area 3b of the center pillar reinforce member 1 is similar to the other area 3c in this deformation-phenomenon.

That is to say, the present embodiment is available in absorbing energy of the side impact with the center pillar reinforce member 1 strengthened in the side impact. In other words, a single member has both a deformation-resisting portion and an impact-absorbing portion. Thus, safety performance is improved in the side impact of vehicle without piling the second reinforce member or the third reinforce member onto the center pillar reinforce member 1.

Moreover, the present embodiment can adjust the strength distribution in response to a location in the press-formed article. On the other hand, the piling of the second reinforce member or the third reinforce member can't meet the requirement of forming the strength distribution.

In the present embodiment, the thickness of the center pillar reinforce member 1 falls generally in the vicinity from 0.8 to 1.5 mm, for example 1.4 mm. Such thickness can cause that quench hardening is carried out throughly from the surface of the center pillar reinforce member 1 to the back surface in the thickness direction.

Figure 2:
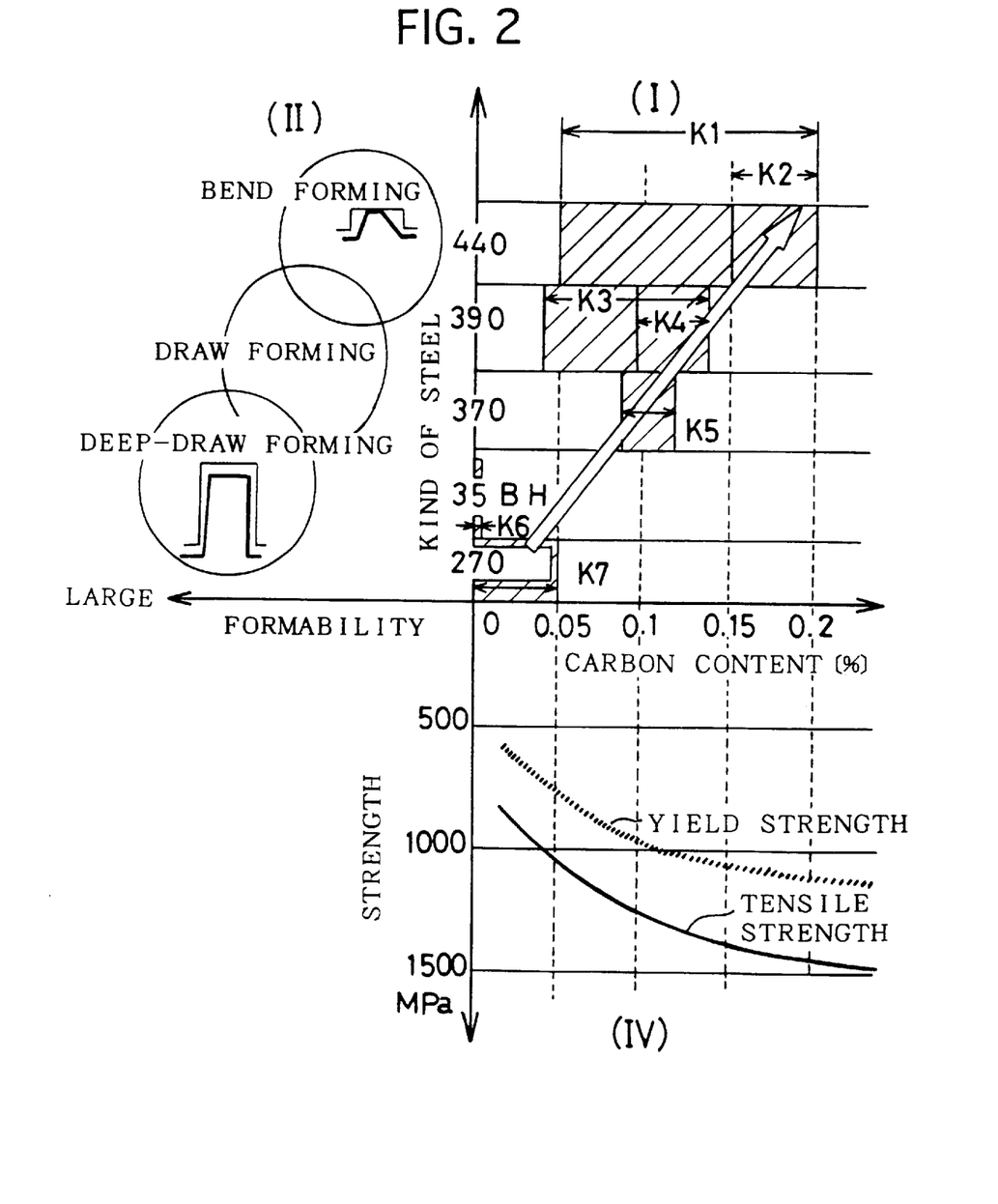
FIG. 2 is a graph for showing a relationship among carbon content, types of steel, formability of steel, and strength after quenching.

FIG. 2 shows the specific properties of the kind of steel standardized generally as steel sheets for vehicles. The first coordinate (I) of FIG. 2 shows a relationship between steel-kind and carbon content. The second coordinate (II) shows a relationship between steel-kind and formability. The fourth coordinate (IV) shows a relationship between carbon content and strength (yield strength, tensile strength) after quench hardening.

The first coordinate (I) of FIG. 2 shows that carbon content of JIS-SPFC 440 or SAPH 440 is set in the range of "K1", also is set especially in the range of "K2". Carbon content of JIS-SPFC 390 or SAPH 400 is set in the range of "K3", also is set especially in the range of "K4". Carbon content of JIS-SPFC 370 or SAPH 370 is set in the range of "K5", carbon content of JIS-SPFC 340H is set in the range of "K6", and carbon content of JIS-SPCC is set in the range of "K7". This is similar in a galvanized steel sheet made from such material.

As appreciated from the first coordinate (I) and the second coordinate (II) of FIG. 2, in the steel sheet having lower carbon content, the steel sheet includes a large formability to be capable of deep-draw forming. However, the formability gradually decreases with the increase of carbon content. For example, JIS-SPFC 440 is to be carried out not in a deep-draw forming but in a bend forming to have a lowly-formed degree.

As appreciated from the fourth coordinate (IV) of FIG. 2, quenched strength (yield strength, tensile strength), implying strength after quenching, is gradually increased with the increase of carbon content. Therefore, it is required that the carbon content of the center pillar reinforce member 1 is restricted in its upper-limit and its lower-limit under consideration of both the required strength after quenching and the formability.

In the case where the center pillar reinforce member 1 is strengthened because of quenching, the upper-limit of carbon content is preferably at 0.20% in view of forming, and can be sometimes at 0.25%. The lower-limit of carbon content is preferably at 0.10% in view of the required strength of the center pillar reinforce member 1, and can be sometimes at 0.05%.

Accordingly, in the case of the center pillar reinforce member 1, carbon content of the center pillar reinforce member 1 can be set in the range of from 0.05 to 0.25%, especially in the range of from 0.10 to 0.20%.

According to the center pillar reinforce member 1 whose carbon content is restricted in the aforementioned range, the metallurgical structure of portions having high hardness is mainly constituted from martensite or bainite, and the metallurgical structure of portions having low hardness is constituted from the structure in which pearlite and ferrite are mixed with martensite or bainite.

Figure 3:
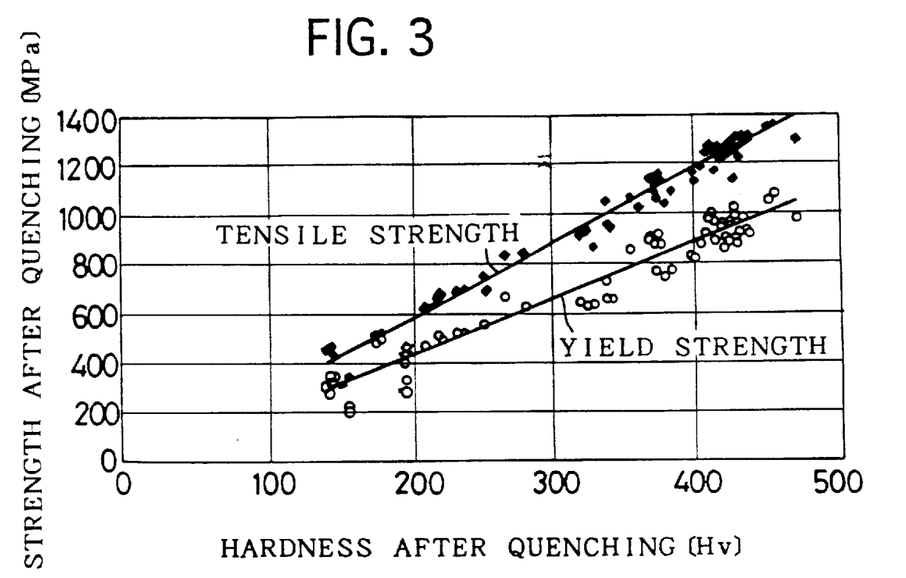
FIG. 3 is a graph for showing a relationship between hardness after quenching and strength after quenching.

Generally, there is a relative relationship between strength after quenching and hardness after quenching. For example, according to the test-pieces made from JIS-SPFC 440 being employed as a steel sheet for vehicle-bodies, FIG. 3 shows a relationship between strength after quenching and hardness after quenching. FIG. 3 shows a tendency that the strength after quenching, both of yield strength and tensile strength, is increased with hardness after quenching. Thus, for the comprehending of the strength distribution in the quenched area 3, the comprehending of hardness distribution of the quenched area 3 is important.

Figure 5:
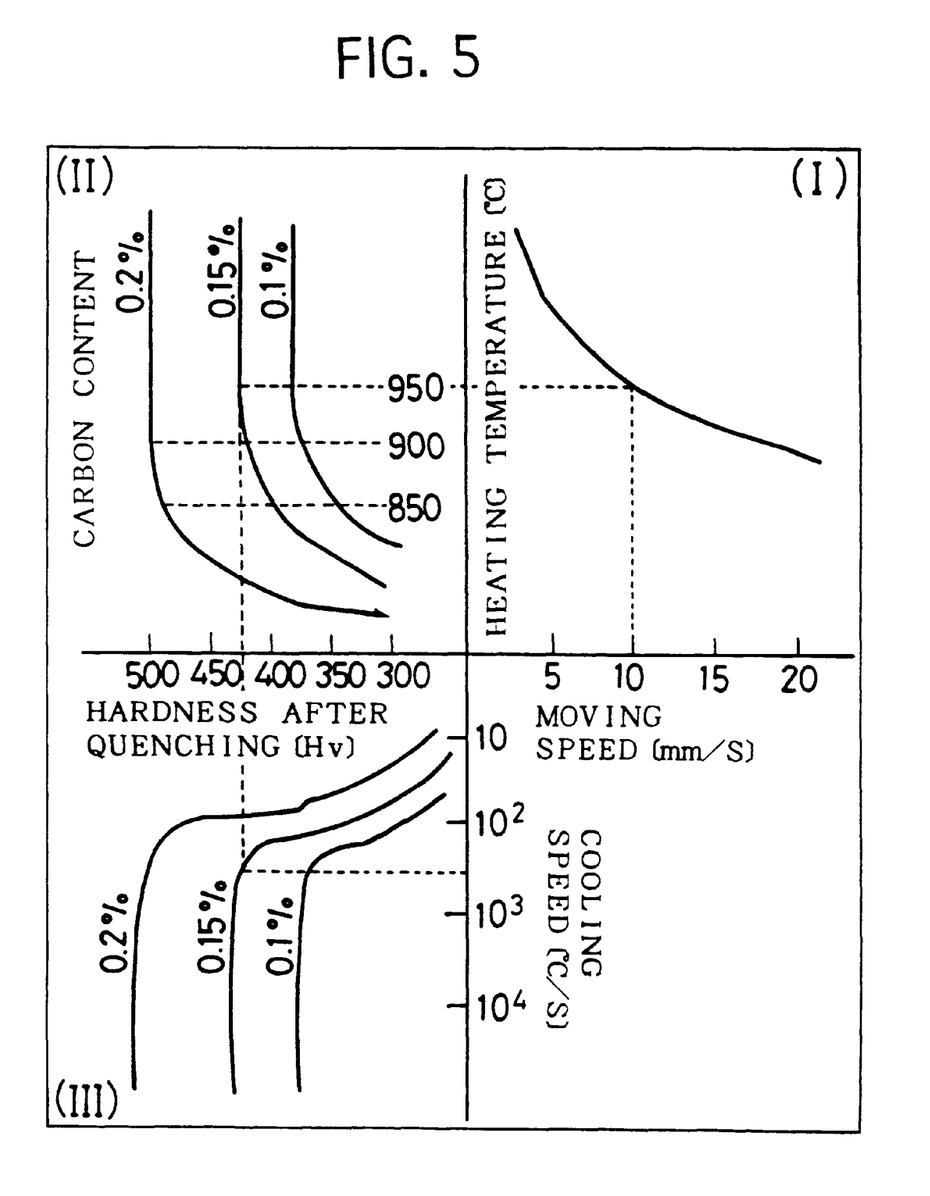
FIG. 5 is a graph for showing a relationship among moving speed, heating temperature, carbon content, cooling speed in quenching, and hardness after quenching.

FIG. 5 shows parameters for obtaining the required quenched hardness in test-examples. In the test-examples, a high-frequency induction hardening apparatus having an induction coil was relatively moved along the center pillar reinforce member 1. In the test-examples, high-frequency current having 400 kHz was applied to the induction coil of the high-frequency induction hardening apparatus, and a clearance was set at approximately 3 mm between the surface of the center pillar reinforce member 1 and the induction coil.

The first coordinate (I) of FIG. 5 shows a relationship between moving speed of the induction coil and heating temperature. The second coordinate (II) of FIG. 5 shows a relationship among heating temperature, carbon content and hardness after quenching. The third coordinate (III) of FIG. 5 shows a relationship among cooling speed after heating, carbon content, and hardness after qunching.

As appreciated in the first coordinate (I) of FIG. 5, the heating temperature was higher with a decrease of relative moving speed between the induction coil and the center pillar reinforce member 1, and the heating temperature was lower with an increase of relative moving speed.

As appreciated in the second coordinate (II) of FIG. 5, supposing that test-pieces were in the same temperature, the hardness after quenching had a tendency to become higher with an increase in carbon content.

As appreciated in the third coordinate (III) of FIG. 5, hardness after quenching had a tendency to become higher with an increase in cooling speed. However, supposing that cooling speed exceeded a designated speed, for example, a speed exceeding the range of from 850 to 950[° C./sec], the hardness after quenching was saturated. In the case of cooling the center pillar reinforce member 1 with water, the cooling speed is generally set in the range of from 500 to 2000[° C./sec].

In accordance with the present embodiment whose quenched area 3 is arranged in the center pillar reinforce member 1, the central area 3*a* disposed at the middle portion in the longitudinal direction is strengthened to have the highest hardness; hardness thereof decreases gradually as it approaches the one end portion 11 and the other end portion 12 from the central area 3*a*.

That is to say, in view of the protection in the side impact of vehicle, the quenched area 3 has a hardness distribution whose hardness transition exhibits a mountain-configuration along the longitudinal direction in order to correspond to the strength distribution being required as the center pillar reinforce member 1.

For obtaining this hardness distribution by use of a high-frequency induction hardening apparatus having an induction coil and a water-spouting means, when the high-frequency induction hardening apparatus and the center pillar reinforce member 1 are relatively moved in the longitudinal direction of the center pillar reinforce member 1, the relative moving speed may properly be adjusted.

Figure 4:
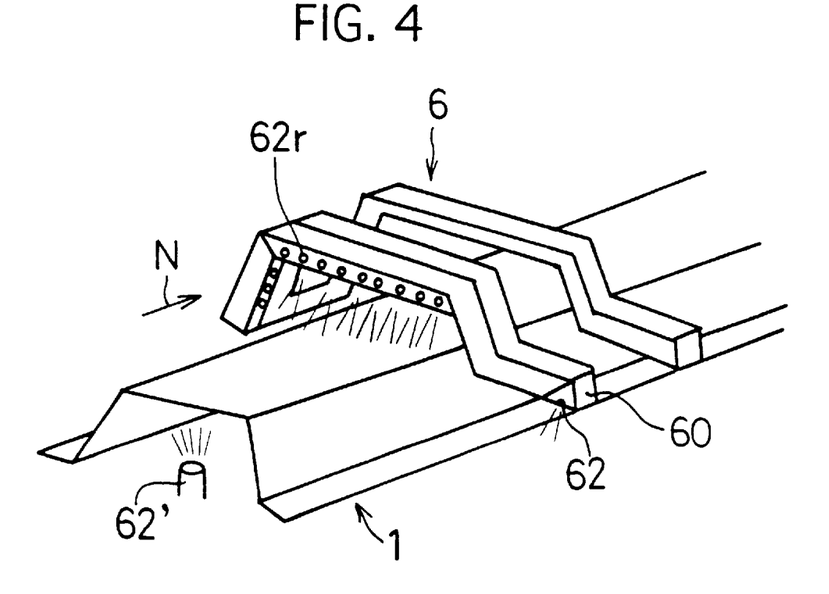
FIG. 4 is a perspective view showing a constitutional configuration for quenching a center pillar reinforce member by use of an induction hardening apparatus.

For example, as appreciated from FIG. 4, the high-frequency induction hardening apparatus 6 includes an induction coil 60 and a water-spouting means 62 having a pipe-shape and connected to the induction coil 60. Here, the high-frequency induction hardening apparatus 6 is set to be a movable system. Hence, the high-frequency induction hardening apparatus 6 is moved along the longitudinal direction of the center pillar reinforce member 1 at a designated speed in the arrow "N" direction with high-frequency current supplied to the induction coil 60. Thus, the center pillar reinforce member 1 is induction-heated to high temperature by use of the induction coil 60. Further, cooling water, discharged from spouting holes 62*r* of the water-spouting means 62, is spouted to the portions heated in high temperature so as to cool the heated portions forcibly, thereby arranging the quenched area 3.

Here, as shown in FIG. 4, it is desirable that a water-spouting means 62' is equipped for cooling the back surface of the center pillar reinforce member 1.

This allows that the hardness distribution of the quenched area 3 is adjusted in response to a moving speed of the high-frequency induction hardening apparatus 6. Concretely, at the area requiring high hardness in the quenched area 3, speed of the high-frequency induction hardening apparatus 6 may be set at low. So, this causes the induction-heat to increase, thereby increasing the heating temperature of the center pillar reinforce member 1 to ensure quenched effect, with higher quenched hardness.

On the other hand, at the area requiring low hardness in the quenched area 3, speed of the high-frequency induction hardening apparatus 6 may be set at high. So, this causes the induction-heat to decrease, thereby decreasing the heated temperature of the center pillar reinforce member 1 to lessen quenched effect, with lower quenched hardness.

Figure 6:
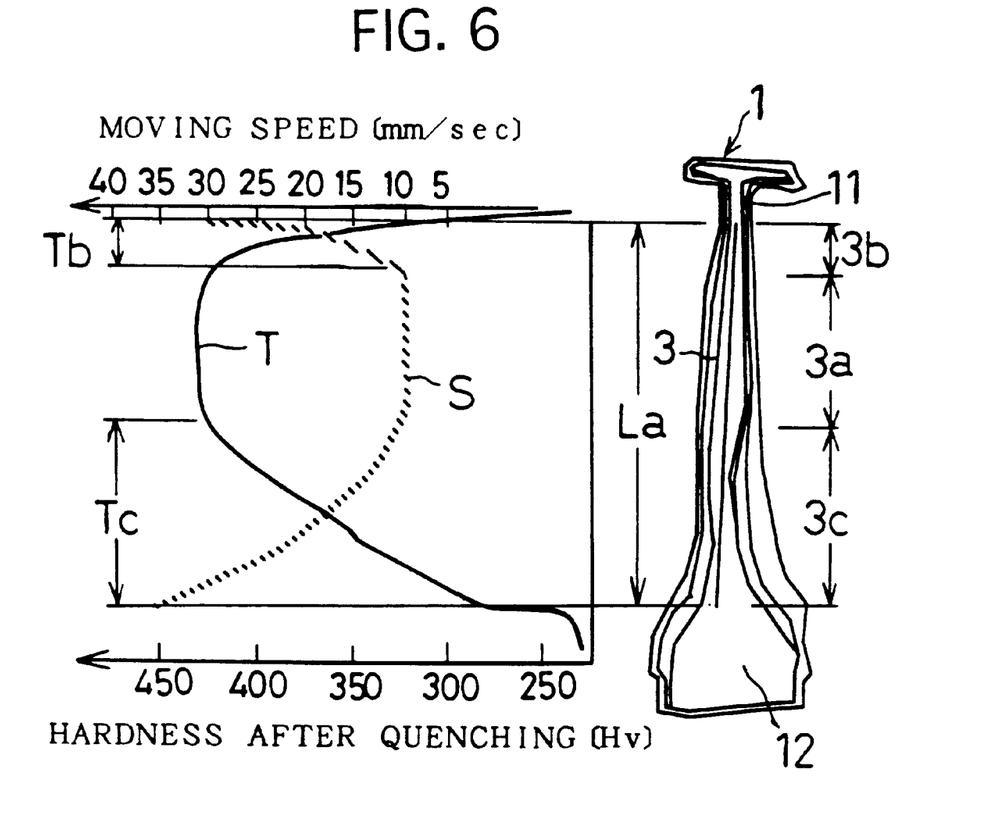
FIG. 6 is a graph for showing a relationship between moving speed and hardness after quenching.

FIG. 6 shows test-examples in which quenching treatment is carried out in a center pillar reinforce member 1 (material: JIS-SPFC 440, carbon content: 0.15%). FIG. 6 shows a relationship between hardness and moving speed in the quenched area 3 having quenched region "La". The characteristic line "S" in FIG. 6 exhibits moving speed, and the characteristic line "T" exhibits hardness. The characteristic line "S" shows that the moving speed is lower in the central area 3*a* of the center pillar reinforce member 1 and that the moving speed is higher in the one area 3*b* and the other area 3*c* of the center pillar reinforce member 1.

Moreover, in FIG. 6, as appreciated from the characteristic line "T" showing hardness distribution, hardness of the central area 3*a* falls in the vicinity from Hv 420 to 440, and is the most hardest in the center pillar reinforce member 1; so, a descent inclination "Tb" is generated to decrease hardness thereof gradually as it approaches the one end portion 11. Also, a descent inclination "Tc" is generated to decrease hardness thereof gradually as it approaches the other end portion 12. Here, this causes the hardness distribution having a mountain-configuration.

A strength incline rate (a strength incline rate converted from hardness) in the descent inclination "Tb" disposed at the upper-side can fall in the range of from 0.5 to 4[kgf/mm$^2$], especially in the range of from 0.5 to 2[kgf/mm$^2$], per 1[mm] in the longitudinal direction of center pillar reinforce member 1. A strength incline rate in the descent inclination "Tc" disposed at the lower-side can fall in the range of from 0.1 to 3[kgf/mm$^2$], especially in the range of from 0.1 to 0.5[kgf/mm$^2$], per 1[mm] in the longitudinal direction of center pillar reinforce member 1.

Here, as for the non-quenched area out of the center pillar reinforce member 1, hardness was in the vicinity of Hv 150 to 230.

APPLICATION EXAMPLE 1

Figure 7:
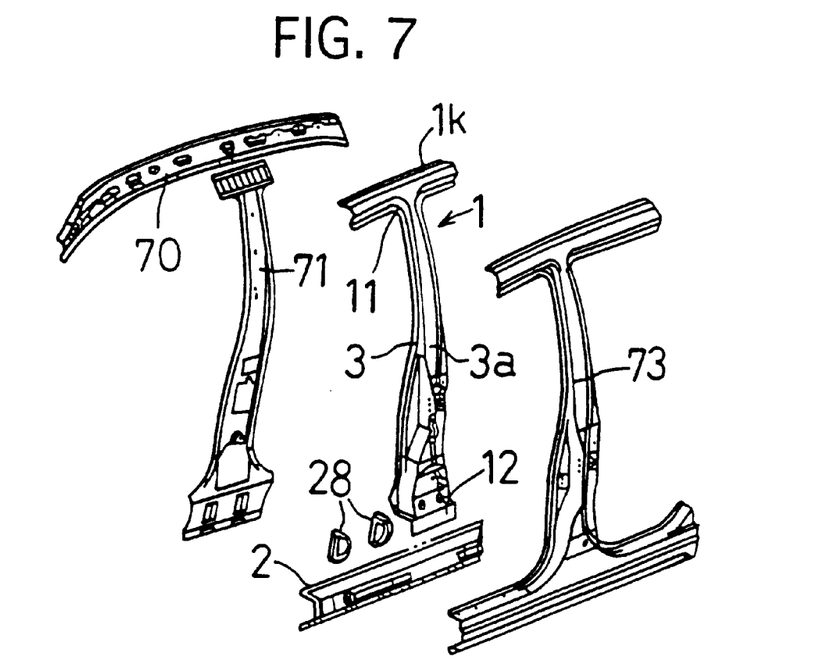
FIG. 7 is a partial perspective view showing one application example.

FIG. 7 shows a perspective view concerning Application Example 1. In Application Example 1, a roof side rail inner member 70 and a center pillar inner member 71 are disposed in the inside of a vehicle. Also, a center pillar outer member 73 is disposed in the outside of the vehicle. Between the both, a center pillar reinforce member 1, a rocker panel 2 having a approximately channel-shape, and a bulk head member 28 are disposed. The rocker panel 2, which is sometimes called a side sill, is to increase the supporting ability for supporting the lower-portion of the center pillar reinforce member 1. The bulk head member 28, which can approximately work as a bamboo joint, is to be fixed onto the rocker panel 2 so as to strengthen the rocker panel 2.

As shown in FIG. 7, at the one end portion 11 of the center pillar reinforce member 1, a lateral portion 1*k* is integrated with the center pillar reinforce member 1 in order to ensure deformation-strength. The lateral portion 1*k* is extended along the roofside-direction, namely, along the front and rear direction of vehicle-body. Therefore, the center pillar reinforce member 1 has a "T"-shape as a whole.

In Application Example 1, a quenched area 3 is arranged in the center pillar reinforce member 1 along the longtidinal direction thereof. The quenched area 3 possesses a hardness distribution having a mountain-configuration whose hardness is highest in the central area 3*a* disposed at the middle of the longtidinal direction and whose hardness is gradually decreased as it approaches the one end portion 11 and the other end portion 12.

In accordance with the conventional technique corresponding to Application Example 1, a second reinforce member having a yield strength of 300 MPa, a thickness of 1.4 mm, and a weight of 1.4 kgf, was independently piled onto a center pillar reinforce member (material: JIS-SPFC 440, target carbon content 0.1%). On the other hand, in Application Example 1, seeing that the quench treatment exhibiting the aforementioned hardness distribution was carried out with respect to the center pillar reinforce member 1 having a yield strength of 300 MPa and a target carbon content of 0.15 %, yield strength after quench treatment was approximately three times as much as that of before quench treatment. Namely, the center pillar reinforce member 1 after quench had a yield strength of 1000 MPa in Application Example 1; hence, the second reinforce member used in the conventional technique was abolished and weight reduction was achieved.

Further, using the vehicle having this center pillar reinforce member 1 held onto the center pillar, the present inventors have tested the vehicle in a side impact of vehicle. Thus, the inventors have confirmed that a deformed amount of vehicle-body was equal to or better than that of the conventional technique, and they have confirmed that the vehicle-body strength was ensured with weight reduction.

APPLICATION EXAMPLE 2

Figure 8:
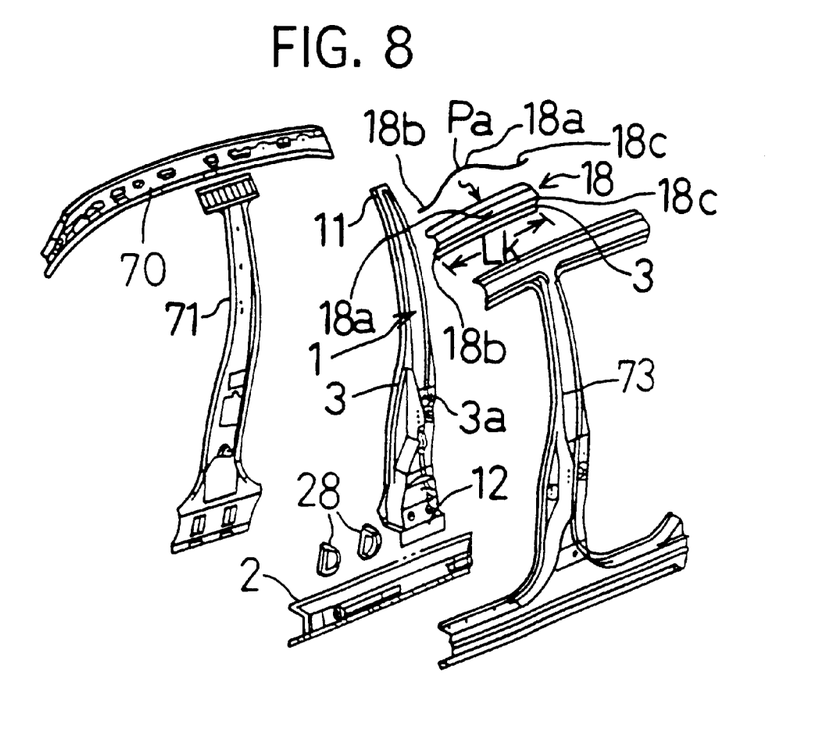
FIG. 8 is a partial perspective view showing another application example.

FIG. 8 shows a decomposed perspective view concerning Application Example 2. The present Application Example 2 is basically similar to Application Example 1. A center pillar reinforce member 1 of Application Example 2 has a "I"-shape. Also, a roof side rail reinforce member 18 having a length "Lk" is fixed onto the one end portion 11 of the center pillar reinforce member 1.

In Application Example 2, a quenched area 3 having a mountain-configuration in hardness is arranged in the center pillar reinforce member 1.

Moreover, a quenched area 3 is arranged in the roof side rail reinforce member 18. This quenched area 3 has a mountain-configuration hardness distribution "Pa", whose hardness is the most highest in a central area 18a disposed at the middle of the roof side rail reinforce member 18 and whose hardness is gradually decreased as it approaches the one end portion 18b and the other end portion 18c. Thus, strength is increased in the roof side rail reinforce member 18.

Figure 9:
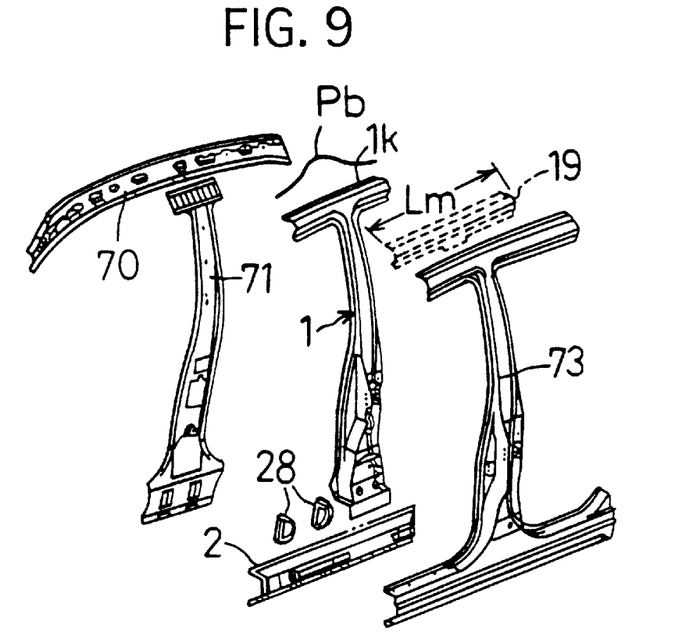
FIG. 9 is a partial perspective view showing further another application example.

FIG. 9 shows a decomposed perspective view concerning another Application Example 2. In accordance with a conventional technique corresponding to Application Example 2, a roof side rail reinforce member 19 having a length "Lm" was piled onto an upper-portion of a center pillar reinforce member 1 having a "T" shape possessing a lateral portion 1k for strengthening itself. However, in Application Example 2, in the lateral portion 1k of the center pillar reinforce member 1, a mountain configuration hardness distribution "Pb" is arranged along the longitudinal direction of the lateral portion 1k to strengthen the lateral portion 1k. Thus, Application Example 2 can abolish the roof side rail reinforce member 19 as distinct from the conventional technique requiring the roof side rail reinforce member 19.

APPLICATION EXAMPLE 3

Figure 10:
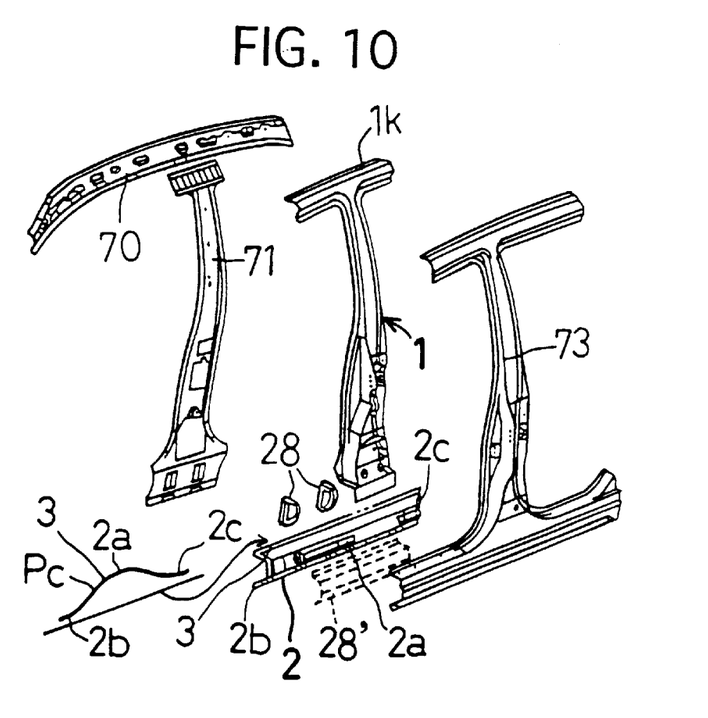
FIG. 10 is a partial perspective view showing the other application example.

FIG. 10 shows a decomposed perspective view concerning Application Example 3. In accordance with a conventional technique corresponding to Application Example 3, as shown at the imaginary line in FIG. 10, a reinforce member 28' is piled onto a rocker panel 2 for strengthening the rocker panel 2.

In Application Example 3, however, a mountain configuration hardness distribution is arranged in a center pillar reinforce member 1. Moreover, another quenched area 3 having a mountain configuration hardness distribution "Pc" is arranged in the rocker panel 2.

That is to say, the quenched area 3 arranged in the rocker panel 2 has a mountain-configuration hardness distribution whose hardness is the most highest in a central area 2a disposed at the middle of the rocker panel 2 and whose hardness is gradually decreased as it approaches the one end portion 2b and the other end portion 2c. This can abolish the reinforce member 28' used conventionally, and can contribute to weight reduction.

What is claimed is:

1. A press-formed article having a quenched area and a required strength distribution, said press-formed article has one end portion, the other end portion, and a central area disposed between said one end portion and said other end portion; and said quenched area having a hardness-varying distribution along a length transverse to a direction of press forming and exhibiting a hardness transition which corresponds to said required strength distribution, wherein said hardness-varying distribution of said quenched area exhibits a condition that hardness is the highest in said central area in such a manner that hardness is gradually decreased from said central area to said one end portion and to said other end portion.

2. A press-formed article having a quenched area and a required strength distribution according to claim 1, wherein said hardness distribution of said quenched area exhibits a mountain configuration whose hardness is the highest in said central area and whose hardness is gradually decreased from the central area to said one end portion and to said other end portion.

3. A press-formed article having a quenched area and a required strength distribution according to claim 1, wherein said press-formed article is to be fabricated and then used in a vehicle;

said quenched area of said press-formed article is divided into a central area for requiring the most strength with respect to a side impact of vehicle generating an impact load distribution, one area disposed at the upper-portion of the central area, and the other area disposed at the lower-portion of the central area;

said hardness-varying distribution of said quenched area exhibits a condition that hardness is the highest is said central area in such a manner that hardness is gradually decreased from said central area to said one area and to said other area; and the strength in said central area is set to afford to have the surplus strength as compared with said impact load distribution in such a manner that said central area of said press-formed article has deformation-resisting ability in said side impact of vehicle and in such a manner that at least one of said one area and said other area is deformed prior to said central area in order to have impact-absorbing ability.

4. A press-formed article having a quenched area and a required strength distribution according to claim 1, wherein said press-formed article is to be fabricated and then used in a vehicle, and wherein said press-formed article is one to which a concentrated input load is affected;

said press-formed article is to be fabricated along the height-direction thereof in vehicle; and the height position of said quenched area corresponds to the height position of said concentrated input load.

5. A press-formed article having a quenched area and a required strength distribution according to claim 1, wherein said press-formed article is a center pillar reinforce member for strengthening a center pillar disposed between a front door and a rear door in a vehicle-side.

6. A press-formed article having a quenched area and a required strength distribution according to claim 1, wherein said press-formed article is a rocker panel for supporting a lower-portion of a center pillar reinforce member for strengthening a center pillar disposed between a front door and a rear door in a vehicle-side.

7. A press-formed article having a quenched area and a required strength distribution according to claim 1, wherein said press-formed article is a roof side rail reinforce member to be disposed at an upper-portion of a center pillar reinforce member for strengthening a center pillar disposed between a front door and a rear door in a vehicle-side.

8. A press-formed article having a quenched area and a required strength distribution according to claim 1, wherein said press-formed article is made of steel family capable of quenching.

9. A press-formed article having a quenched area and a required strength distribution according to claim 1, wherein said press-formed article is made of steel family including carbon, and said steel family includes 0.05 to 0.25% by weight of carbon.

10. A press-formed article having a quenched area and a required strength distribution according to claim 1, wherein said press-formed article has one of the group selected from a sheet shape, a board shape, a channel shape, and an angle shape; and said quenched area is constituted from a surface thereof to a back surface thereof in a depth direction of said press-formed article.

11. A press-formed article having a quenched area and a required strength distribution according to claim 1, wherein said press-formed article has one of the group selected from a sheet shape, a board shape, a channel shape, and an angle shape; and said quenched area is constituted at a surface of said press-formed article.

12. A press-formed article having a quenched area and a required strength distribution according to claim 1, wherein said press-formed article has a non-quenched area whose hardness falls in the range of from Hv 150 to 230, said quenched area includes the highly hardened area whose hardness falls in the range of from Hv 300 to 500, and a not highly hardened area whose hardness falls in the range of from Hv 230 to 300.

13. A press-formed article having a quenched area and a required strength distribution according to claim 1, wherein said press-formed articles has a length, said quenched area has a descent inclination whose strength is decreased gradually as it goes toward its end, and a strength inclining rate of said descent inclination falls in the range of from 0.5 to 4 kgf/mm$^2$ per 1 mm in the length direction of said press-formed article.

14. A method for strengthening a press-formed article, using a press-formed article requiring a designated strength distribution,
and comprising the step of:
quenching said press-formed article to constitute a quenched area having a hardness distribution exhibiting a hardness transition which corresponds to said designated strength distribution;
wherein said press-formed article has one end portion, the other end portion, and a central area disposed between said one end portion and said other end portion; and said hardness distribution of said quenched area exhibits a condition that hardness is the highest in said central area in such a manner that hardness is gradually decreased from said central area to said one end portion and to said other end portion.

15. A method for strengthening a press-formed article according to claim 14, wherein said quenching is carried out by use of a high-frequency induction hardening apparatus having an induction coil for heating said press-formed article and a cooling means for spouting coolant, and said hardness distribution is obtained by controlling heating-conditions and cooling-conditions in said high-frequency induction hardening apparatus.

16. A method for strengthening a press-formed article according to claim 14, wherein at least one of said high-frequency induction hardening apparatus and said press-formed article is movable with respect to the other of said high-frequency induction hardening apparatus and said press-formed article; and said controlling heating-conditions and cooling-conditions are carried out by controlling a relative moving speed between said high-frequency induction hardening apparatus and said press-formed article.

17. A method of strengthening a press-formed article according to claim 14, wherein said quenching is carried out by heating said press-formed article and by cooling said press-formed article after heating, and a cooling speed for quenching said press-formed article is set in the range of from 500 to 2000° C./sec.

18. A method for strengthening a press-formed article according to claim 14, wherein said press-formed article has an area required for high hardness and an area which doesn't require high hardness;

said quenching is carried out by heating said press-formed article and by cooling said press-formed article after heating; and heating temperature of said quenching is in the range of from 950 to 1200° C. at the area required for high hardness of said press-formed article, and heating temperature of said quenching is in the range of from 800 to 950° C. at the area which doesn't require high hardness of said press-formed article.

19. A method for strengthening a press-formed article according to claim 14, wherein said press-formed article has a non-quenched area whose hardness falls in the range of from Hv 150 to 230; and said quenched area includes a highly hardened area whose hardness falls in the range of from Hv 300 to 500, and a not highly hardened area whose hardness falls in the range of from Hv 230 to 300.

20. A method for strengthening a press-formed article according to claim 14, wherein said press-formed articles has a length, said quenched area has a descent inclination whose strength is decreased gradually as it goes toward its end, and a strength inclining rate of said descent inclination falls in the range of from 0.5 to 4 kgf/mm$^2$ per 1 mm in the length direction of said press-formed article.

21. A press-formed article having a quenched area and a required strength distribution according to claim 1, wherein said quenched area has one end portion and an other end portion; and said hardness distribution of said quenched area exhibits a condition that the hardness is highest in a mid portion between said one end portion of said quenched area and the other end portion of said quenched area in such a manner that the hardness is gradually decreased from said mid portion to the one end portion of said quenched area and to the other end portion of said quenched area.

22. A press-formed article having a quenched area and a required strength distribution according to claim 21, wherein said hardness distribution of said quenched area exhibits a mountain configuration whose hardness is the highest in the mid portion of said quenched area and whose hardness is gradually decreased from said central area to the one end portion of said quenched area and to the other end portion of said quenched area.

23. A method for strengthening a press-formed article requiring a designated strength distribution, and comprising the step of:

quenching said press-formed article to constitute a quenched area having a hardness distribution exhibiting a hardness-varying transition along a length transverse to a direction of press forming which corresponds to said designated strength distribution;

wherein said quenched area has one end portion and an other end portion; and said hardness distribution of said quenched area exhibits a condition that the hardness is highest in a mid portion between the one end portion of said quenched area and the other end portion of said quenched area in such a manner that the hardness is gradually decreased from said mid portion to the one end portion of said quenched area and to the other end portion of said quenched area.

24. A method for strengthening a press-formed article according to claim 16, wherein a relative moving speed of an area requiring high hardness is slower than that of an area not requiring high hardness.

25. The press-formed article of claim 1, wherein said quenched area extends in two dimensions.

26. The press-formed article of claim 14, wherein a higher hardness portion of said hardness distribution corresponds to a location of an impact load to be applied to said press formed article.

27. The press-formed article of claim 23, wherein a higher hardness portion of said hardness distribution corresponds to a location of an impact load to be applied to said press formed article.

28. The press-formed article of claim 14, further comprising the step of heating said press-formed article by traversing said press-formed article with an induction heating member of a high frequency induction heating apparatus.

29. The press-formed article of claim 23, further comprising the step of heating said press-formed article by traversing said press-formed article with an induction heating member of a high frequency induction heating apparatus.

30. The press-formed article of claim 14, further comprising the step of two dimensionally heating said press-formed article by traversing said press-formed article with an induction heating member of a high frequency induction heating apparatus.

31. The press-formed article of claim 23, further comprising the step of two dimensionally heating said press-formed article by traversing said press-formed article with an induction heating member of a high frequency induction heating apparatus.

* * * * *